United States Patent [19]
Sumner et al.

[11] Patent Number: 5,845,213
[45] Date of Patent: Dec. 1, 1998

[54] METHOD AND APPARATUS FOR MINIMIZING TRAFFIC IN A TWO WAY WIRELESS MESSAGING SYSTEM

[75] Inventors: Terence E. Sumner, Azle; Thomas Casey Hill, Trophy Club, both of Tex.; Thomas V. D'Amico, Boca Raton; Zhonghe Wang, Lake Worth, both of Fla.; Jyh-Han Lin, Keller; Alain C. Briancon, McKinney, both of Tex.; Samir Sawaya, San Diego, Calif.; Steven J. Goldberg, Fort Worth, Tex.

[73] Assignee: Motorola, Inc., Schaumburg, Ill.

[21] Appl. No.: 753,070

[22] Filed: Nov. 20, 1996

[51] Int. Cl.⁶ .................................................. H04B 7/155
[52] U.S. Cl. ...................... 455/458; 455/38.1; 455/456; 455/517
[58] Field of Search ................... 455/31.1, 31.2, 455/31.3, 38.1, 38.4, 421, 422, 432, 433, 456, 457, 458, 507, 517, 524, 67.1, 67.7; 340/825.44

[56] References Cited

U.S. PATENT DOCUMENTS 4,875,038 10/1989 Siwiak et al. ...................... 340/825.47
5,153,902 10/1992 Buhl et al. ............................... 455/458
5,369,681 11/1994 Boudreau et al. ...................... 455/458
5,381,464 1/1995 O'Keefe et al. ......................... 455/458
5,423,063 6/1995 Goldberg ................................ 455/54.1
5,475,863 12/1995 Simpson et al. ........................ 455/31.3

*Primary Examiner*—Thanh Cong Le
*Attorney, Agent, or Firm*—Pablo Meles; Charles W. Bethards

[57] ABSTRACT

A non-real time messaging system (200) for targeting messages to a subscriber unit (222) comprises a synchronized profile of where a subscriber unit should be located (a predetermined base transmission area for transmission of messages to the subscriber unit) maintained between a controller (212) and the subscriber unit. The subscriber unit detects when the subscriber unit is not within the receiving range of a predetermined base transmission area, informs the controller and the controller directs subsequent transmissions to an area identified by the subscriber unit and otherwise transmits subsequent messages to the predetermined base transmission area. The system further includes a plurality of base receivers (217) coupled to the controller for receiving transmissions from the subscriber units and allowing the controller to detect when the subscriber unit is not within the receiving range of a predetermined base transmission area.

16 Claims, 8 Drawing Sheets

METHOD AND APPARATUS FOR MINIMIZING TRAFFIC IN A TWO WAY WIRELESS MESSAGING SYSTEM

FIELD OF THE INVENTION

This invention relates in general to a two-way communication system and more specifically to efficient targeted messaging in a non-real time system.

BACKGROUND OF THE INVENTION

The advent of two-way messaging presents a wide variety of new problems. To understand some of the problems, knowledge of two-way paging or messaging from a system level would be useful. In particular, a two-way paging or messaging system typically has an infrastructure system including a plurality of outbound transmitters coupled to a controller for encoding, batching and scheduling the transmission of messages to be sent over the air to a plurality of portable two-way subscriber units having selective call receivers. The subscriber units, not considered part of the infrastructure, also transmit inbound messages that are received by at least one of a plurality of base receivers which are also coupled to the controller. The controller preferably correlates outbound messages with the inbound messages.

Latency and capacity issues arise due to inefficient use of the available channel spectrum. For instance, in two-way messaging systems where targeted messages need to be delivered to a particular subscriber unit, a typical solution can involve repeated registrations by subscriber units creating unnecessary inbound traffic. Another solution might involve a nationwide or system-wide "where-are-you" (WRU) request to a subscriber unit in an unknown location causing unnecessary outbound traffic. The WRU request can be considered an inefficient use of outbound channel capacity since all transmitters in a system would be "lit" up. A system with many subscriber units can easily bog down a system with unnecessary registration traffic as well. In addition, schemes for retrying transmissions to subscriber units are inefficient as well and may also cause unnecessary traffic. Thus, a need exists for method and apparatus for minimizing traffic in a two way wireless messaging system to improve latency and channel capacity.

SUMMARY OF THE INVENTION

In a first embodiment of the present invention, a method of targeting messages to a subscriber unit in a non-real time messaging system comprises the steps at a controller of establishing a profile that assumes the subscriber unit is within a receiving range of a predetermined base transmission area for transmission of messages to the subscriber unit and detects whether the subscriber unit is not within the receiving range of the predetermined base transmission area. If the subscriber unit specifies an identified area for transmission, the controller directs transmissions of message to that identified area and otherwise directs transmissions to the predetermined base transmission area.

In another aspect of the present invention, a method of targeting messages to a subscriber unit in a non-real time messaging system having a controller comprises the steps at a subscriber unit of monitoring base transmitter transmissions for correlation with a predetermined base transmission area stored at a memory location at the subscriber unit. Then transmitting a subscriber unit's location information to the controller if the subscriber unit detects that the base transmitter transmissions do not correlate with the predetermined base transmission area stored in memory as well as directing the controller to send subsequent transmissions to base transmitters corresponding to the subscriber unit's location information, otherwise receiving messages without a preceding transmission of the subscriber unit's location information to the controller.

In yet another aspect of the present invention, a non-real time messaging system for targeting messages to a subscriber unit comprises a controller that assumes the subscriber unit is within a receiving range of a predetermined base transmission area for transmission of messages to the subscriber unit and detects when the subscriber unit is not within the receiving range of a predetermined base transmission area, wherein the controller directs transmissions of messages to an identified area if the subscriber unit identifies the identified area and otherwise transmits to the predetermined base transmission area. The messaging system further comprises a plurality of base receivers coupled to the controller for receiving transmissions from the subscriber units and allowing the controller to detect when the subscriber unit is not within the receiving range of a predetermined base transmission area.

In another aspect of the invention, a subscriber unit for receiving non-real time targeted messages in a two way messaging system having a plurality of base transmitters comprises a selective call receiver coupled to a decoder and a controller as well as a selective call transmitter coupled to the controller and an encoder. The subscriber unit further comprises a memory coupled to the controller containing a profile of when the subscriber unit should be within the receiving range of select portion of the plurality of base receivers, wherein the subscriber unit does nothing if the controller determines that the subscriber unit is within the profile and transmits update information to the two-way messaging system if the subscriber unit is outside the profile.

DETAILED DESCRIPTION

The present invention ideally reduces the number of overhead transmissions that are typically used in a two-way targeted messaging system. The overhead transmissions include system wide "WRU" requests by a system to a subscriber unit, registration transmissions from a subscriber unit to a system to let the system know where a subscriber unit is presently located, and unnecessary retries of transmissions that are not acknowledged. Thus, the present invention in several embodiments will generally describe a method of targeting messages to a subscriber unit in a non-real time messaging system at a system controller individually, at a subscriber unit individually and at both the system controller and subscriber unit working in conjunction.

Figure 1:
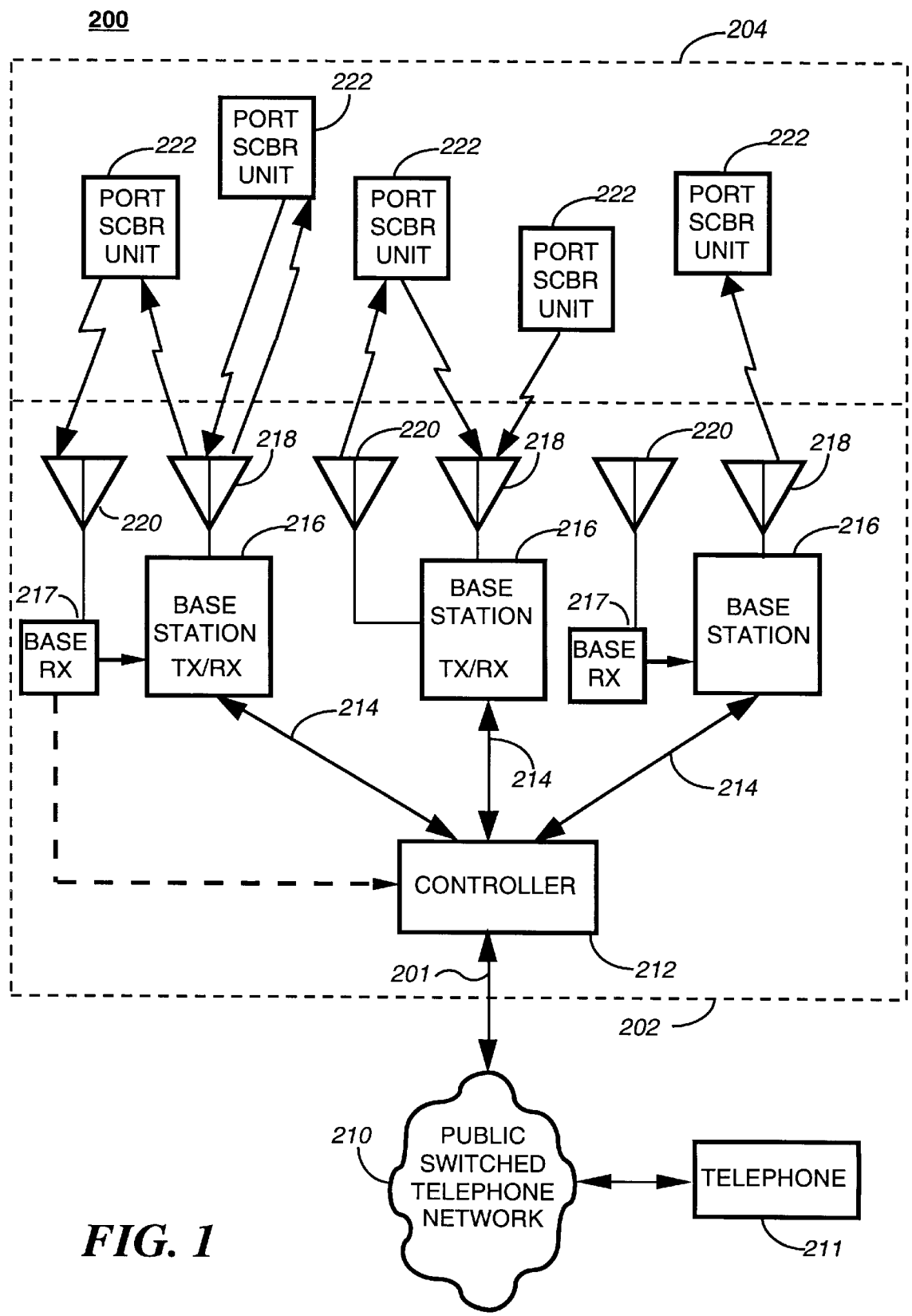
FIG. 1 is an electrical block diagram of a communication system in accordance with a preferred embodiment of the present invention.

Referring to FIG. 1, an electrical block diagram of a communication system 200 in accordance with a preferred embodiment of the present invention comprises a fixed portion 202 and a portable portion 204. The fixed portion 202 comprises a plurality of conventional base transceivers which are base stations 216 coupled by communication links 214 to a controller 212 for controlling the base stations 216. The hardware of the controller 212 is preferably similar to the Wireless Messaging Gateway (WMG™) Administrator! paging control center manufactured by Motorola, Inc. of Schaumburg, Ill. The hardware of the base stations 216 is preferably similar to the RF- Orchestra!™ base station transmitters manufactured by Motorola, Inc. of Schaumburg, Ill. Other similar hardware can be utilized as well for the controller 212 and base stations 216. The controller 212 comprises a plurality of firmware elements in accordance with the preferred embodiment of the present invention.

Each of the base stations 216 transmits radio signals to the portable portion 204 comprising a plurality of portable subscriber units 222 via a transmitting antenna 220. The base stations 216 each receive radio signals from the plurality of portable subscriber units 222 via a receiving antenna 218. It should be understood that the receiving portion of the base stations do not necessarily need to be co-located with the transmitting portions and that there may be multiple base receivers 217 per base station. The base receivers 217 are preferably coupled to the controller 212 either directly or through their respective base stations. The radio signals comprise selective call addresses and messages transmitted to the portable subscriber units 222 and acknowledgments received from the portable subscriber units 222. It will be appreciated that the portable subscriber units 222 can also originate messages other than acknowledgments including registration requests, WRU responses, canned messages as well as text entry messages. The controller 212 preferably is coupled to a conventional telephone 211 via telephone links 201 and a public switched telephone network (PSTN) 210 for receiving selective call originations therefrom. Selective call originations comprising voice and data messages from the PSTN 210 can be generated, for example, from the conventional telephone 211 coupled to is the PSTN 210 in a manner that is well known in the art.

Data and control transmissions between the base stations 216 and the portable subscriber units 222 preferably utilize a well-known digital selective call signaling protocol, such as the Motorola FLEX™ family of protocols. It will be appreciated that other similar protocols can be utilized as well. These protocols utilize well-known error detection and error correction techniques and are therefore tolerant to bit errors occurring during transmission, provided that the bit errors are not too numerous in any one code word.

Outbound channel transmissions comprising data and control signals from the base stations 216 preferably utilize two- and four-level frequency shift keyed (FSK) modulation, operating at sixteen-hundred or thirty-two-hundred symbols-per-second (sps), depending on traffic requirements and system transmission gain. Inbound channel transmissions from the portable subscriber units 222 to the base stations 216 preferably utilize four-level FSK modulation at a rate of ninety-six-hundred bits per second (bps). Inbound channel transmissions preferably occur during predetermined data packet time slots synchronized with the outbound channel transmissions. It will be appreciated that, alternatively, other signaling protocols, modulation schemes, and transmission rates can be utilized as well for either or both transmission directions. The outbound and inbound channels preferably operate on a single carrier frequency utilizing well-known time division duplex (TDD) techniques for sharing the frequency. It will be appreciated that, alternatively, frequency division duplex (FDD) can be utilized as well for the outbound and inbound channels.

U.S. Pat. No. 4,875,038 to Siwiak et al., which describes a prior relevant acknowledge-back selective call communication system, is hereby incorporated herein by reference. For further information on the operation and structure of an acknowledge-back selective call communication system, please refer to the Siwiak et al. patent.

Figure 2:
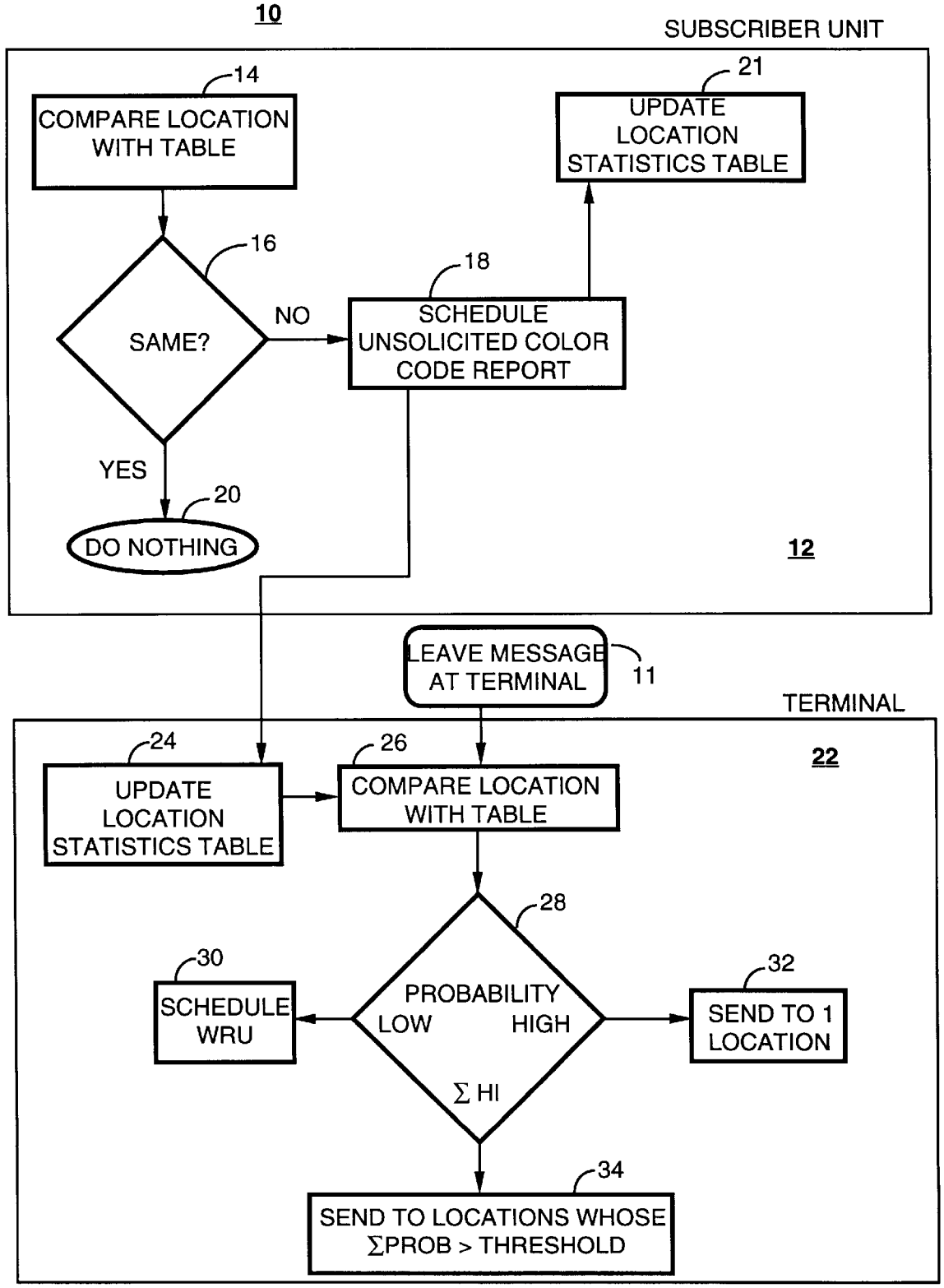
FIG. 2 is a flow chart illustrating the synchronization of profiles between a subscriber unit and a system in accordance with the present invention.
Figure 3:
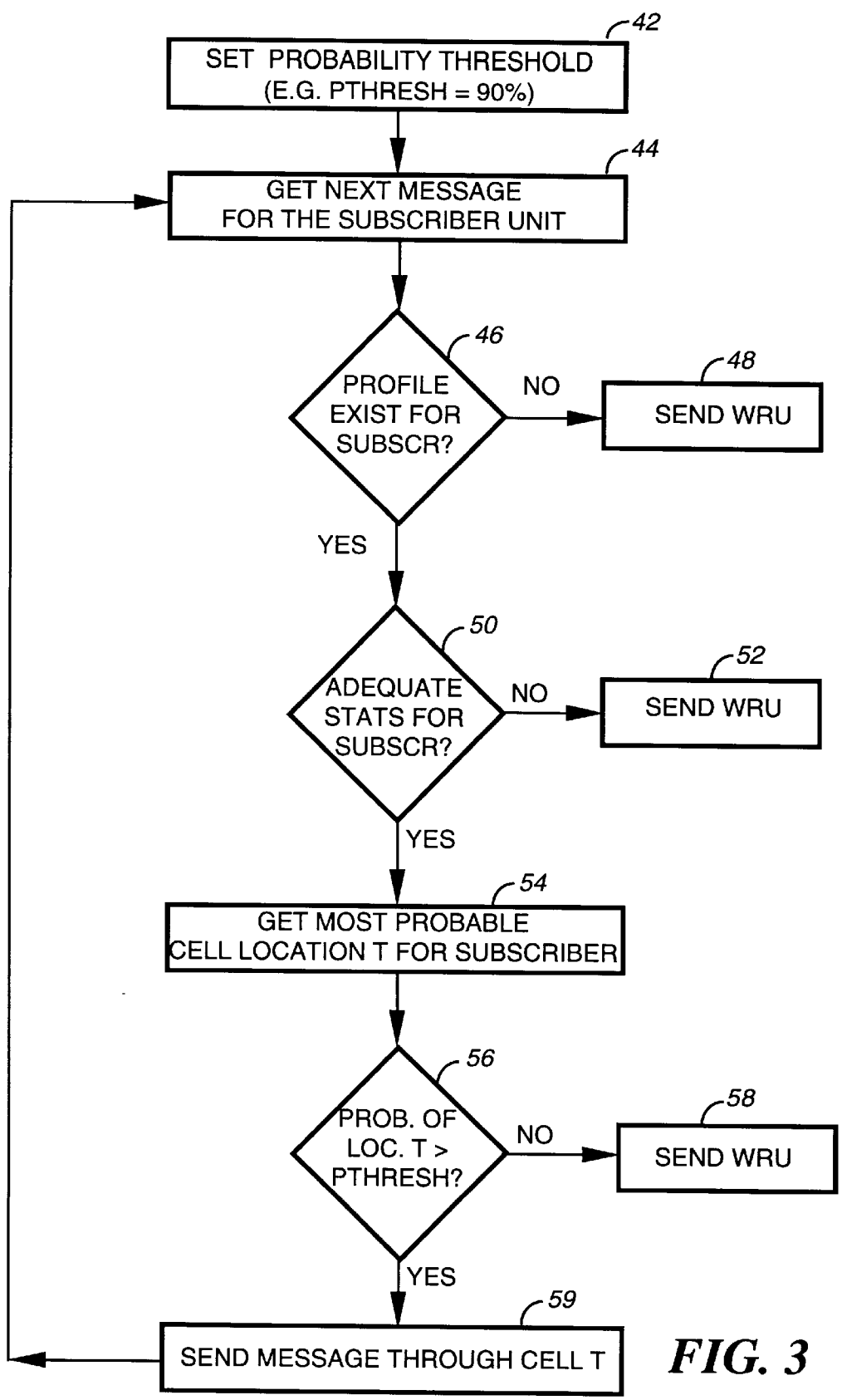
FIG. 3 is a flow chart illustrating a method at a controller of reducing WRU transmissions in accordance with an embodiment of the present invention.
Figure 4:
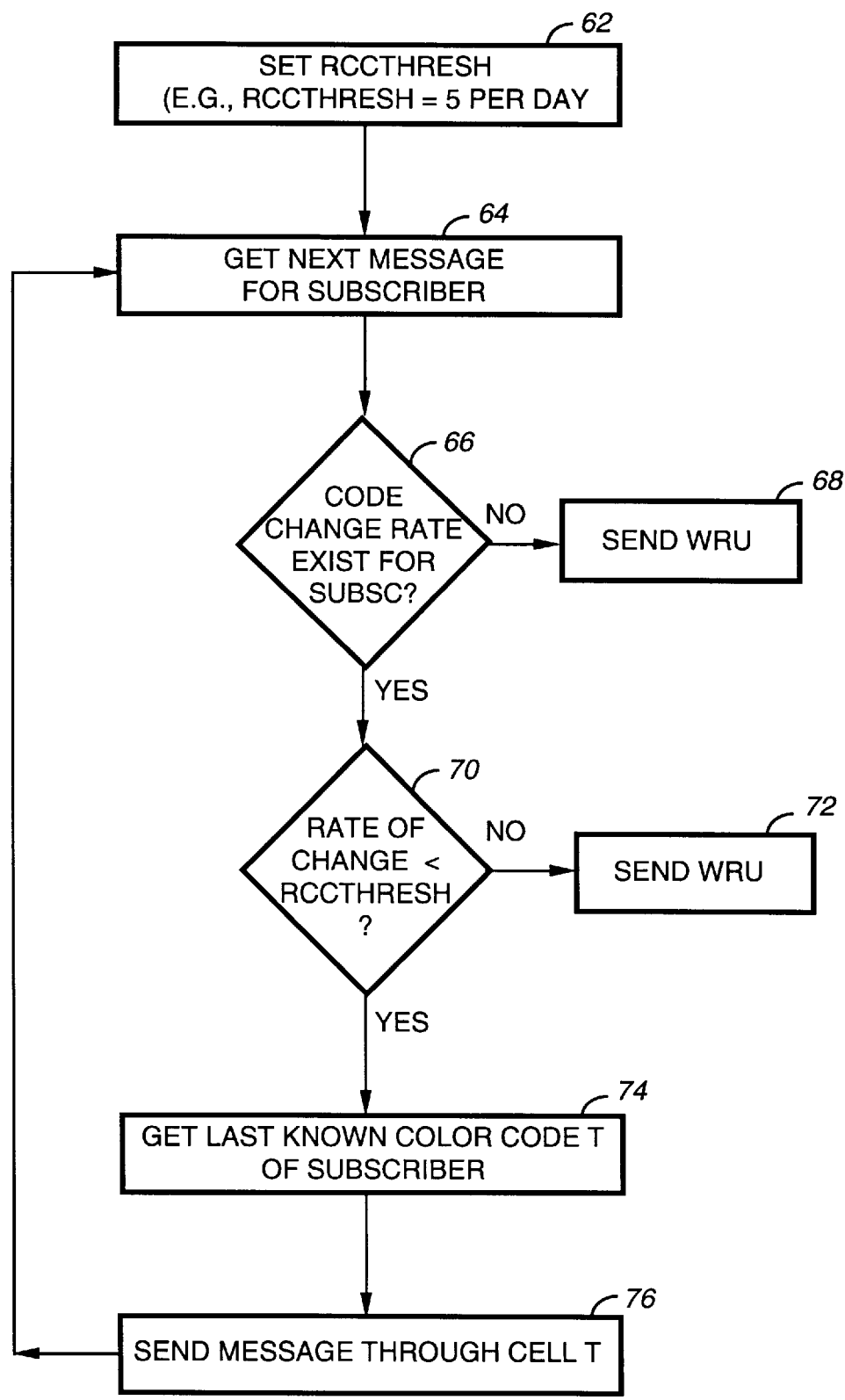
FIG. 4 is flow chart illustrating a method at a controller of reducing WRU transmissions using the rate of change of color codes in accordance with another embodiment of the present invention.
Figure 5:
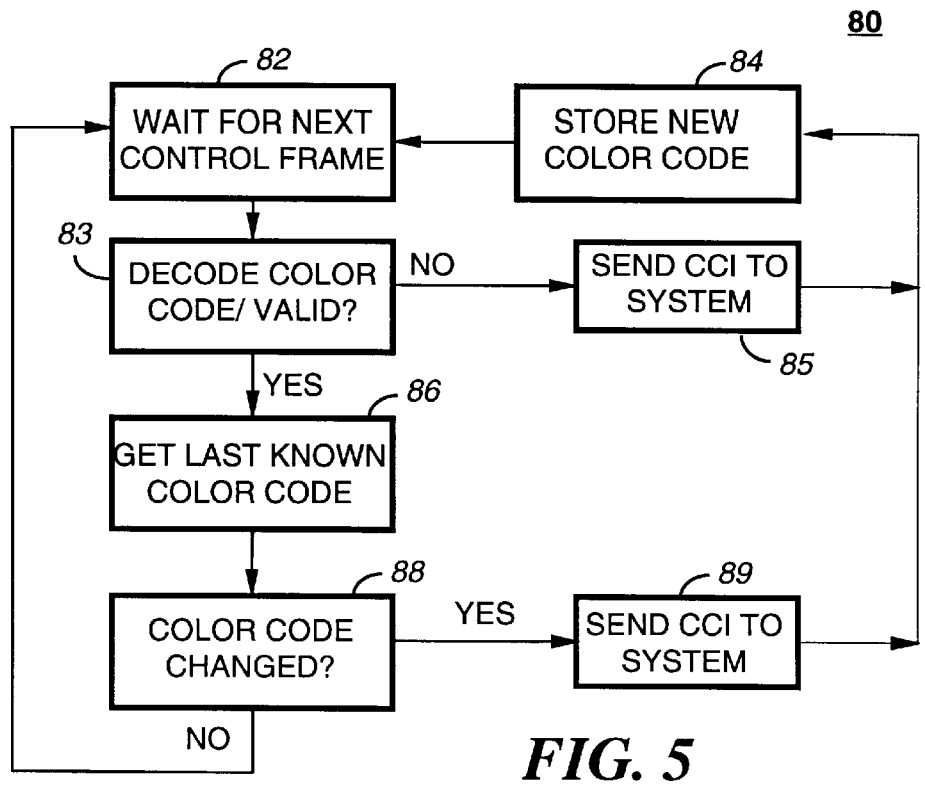
FIG. 5 is flow chart illustrating a method at a subscriber unit of reducing WRU transmissions by identifying changes in color codes in accordance with another embodiment of the present invention.
Figure 6:
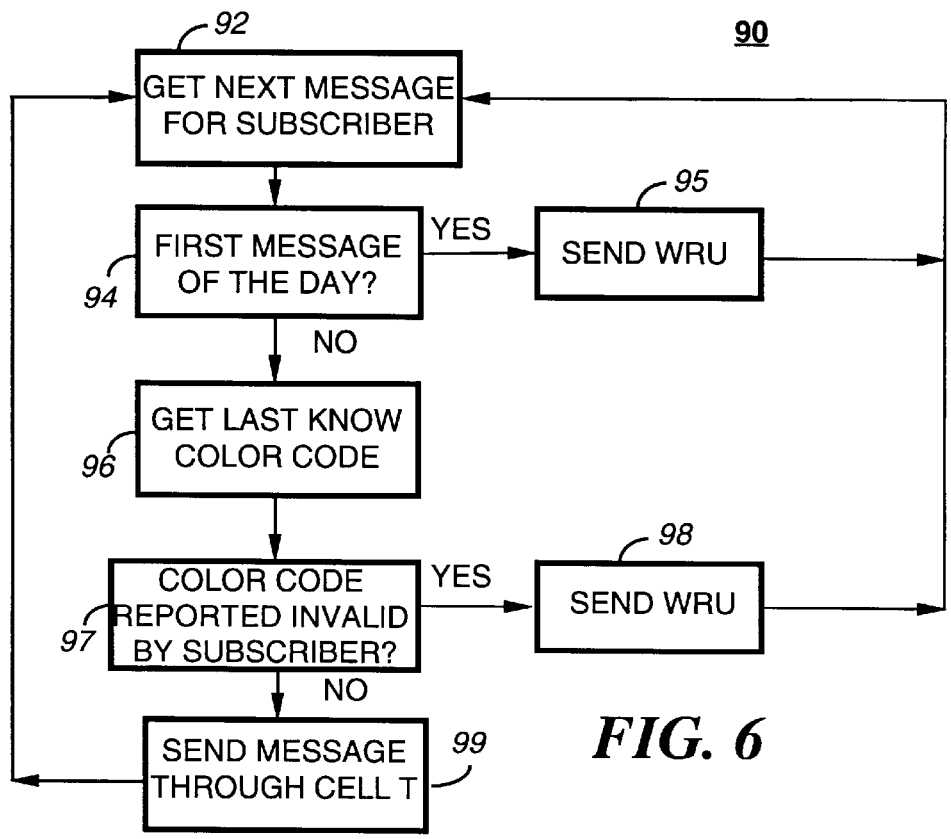
FIG. 6 is flow chart illustrating a method at a controller of reducing WRU transmissions used in conjunction with the method in FIG. 5 in accordance with the present invention.
Figure 10:
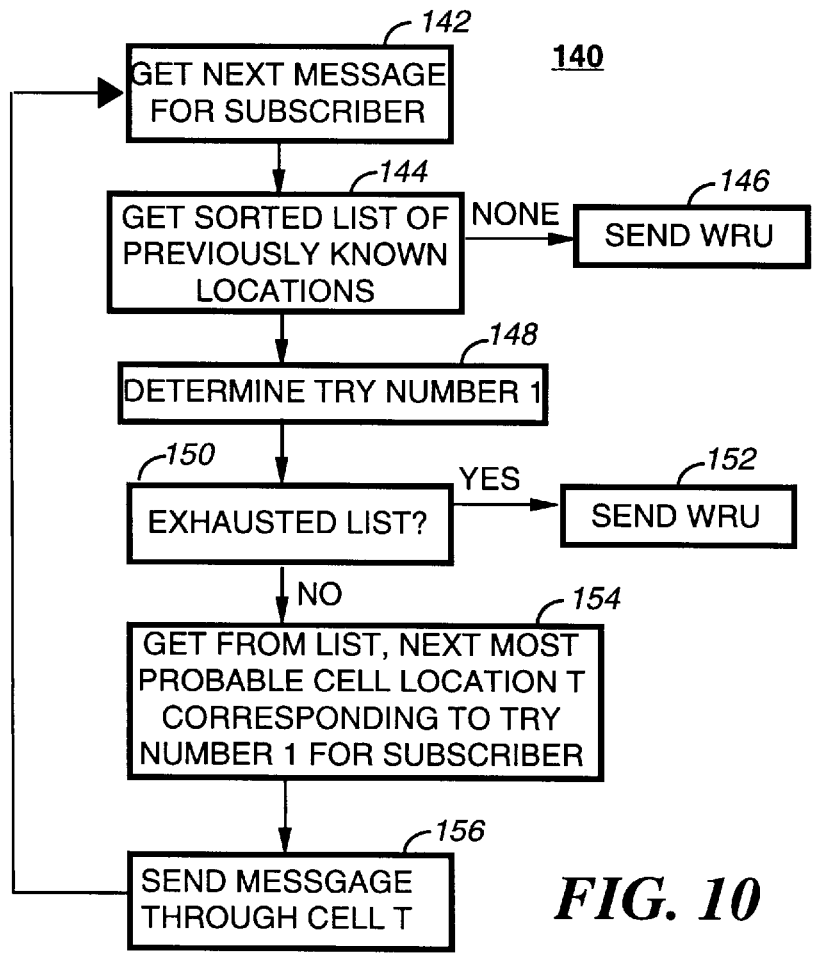
FIG. 10 is flow chart illustrating a method at a controller of reducing WRU transmissions by automatically sending retries to previously known subscriber unit locations in accordance with another embodiment of the present invention.

Operationally, with reference to FIG. 2, a controller such as the controller 212 (of FIG. 1) or a controller within a terminal 22 will establish a profile for each subscriber unit in the system, wherein the profile assumes that the subscriber unit is within a receiving range of a predetermined base transmission area for transmission of messages to the subscriber unit. The controller will ideally detect whether the subscriber unit is within the receiving range of the predetermined base transmission area and direct transmissions of messages to an identified area if the subscriber unit specifies the identified area and otherwise direct transmissions to the predetermined base transmission area. The profile is preferably maintained within a memory location at the controller and contains a database of locations where the subscriber unit is likely to be located for a given period of time. In another embodiment, the step of establishing a profile comprises the step of maintaining a synchronized database of locations where the subscriber unit is likely to be located, wherein the locations are synchronized between a memory at the controller and a memory at the subscriber unit as will be further explained. Preferably, the step of detecting whether the subscriber unit is within the receiving range of predetermined base transmission area further comprises the step of having the subscriber unit register its approximate location with the controller when the synchronized data base of locations do not match for a given period of time. The manner in which the controller detects that the subscriber unit is not within the receiving range of a predetermined base transmission area could be achieved in many different ways. FIGS. 4, 5, 6, and 8 illustrate this detecting step could comprise in one form or another the step of receiving color codes transmitted by base transmitters to the subscriber units and reporting by the subscriber unit to the controller of the color codes that are not within the predetermined base transmission area. In FIG. 4 in particular, the step of establishing a profile could further comprise the step at the controller of receiving a report from the subscriber unit of a rate of change of color codes as seen by the subscriber unit. FIG. 3 illustrates another method wherein the step of establishing a profile could comprise the step of statistical location profiling at the controller for identifying the predetermined base transmission area. FIGS. 5 and 6 illustrates yet another method wherein the step of establishing a profile and detecting a change at the controller from the profile involves the step at the controller of receiving a report from the subscriber unit of a new color code configuration when a prior color code configuration does not match the new color code configuration at the subscriber unit. FIG. 10 illustrates another method wherein the step of establishing a profile and detecting a change at the controller from the profile involves the steps of assuming that the subscriber unit is within one of a plurality of prioritized locations and transmitting a message on a corresponding prioritized basis to each of the plurality of prioritized locations where the subscriber unit is assumed to be located until an acknowledgment is received from the subscriber unit.

Correspondingly, the steps at a subscriber unit for targeting messaging in a non-real time messaging system preferably comprise monitoring base transmitter transmissions for correlation with a predetermined base transmission area stored at a memory location at the subscriber unit and transmitting a subscriber unit's location information to the controller if the subscriber unit detects that the base transmitter transmissions do not correlate with the predetermined base transmission area stored in memory as well as directing the controller to send subsequent transmissions to base transmitters corresponding to the subscriber unit's location information, otherwise receiving messages without a preceding transmission of the subscriber unit's location information to the controller. As described previously in a preferred embodiment, a synchronized database of locations where the subscriber unit is likely to be located is maintained between a memory at the controller and a memory at the subscriber unit. This can be achieved by having the subscriber unit register its approximate location with the controller when the synchronized data base of locations do not match for a given period of time. Use of color codes or transmitter IDs could be transmitted by base transmitters and reported by the subscriber unit to the controller for color codes that are not within the predetermined base transmission area corresponding to a profile or database within the subscriber unit. Alternatively, the method could comprise the step at the subscriber unit of reporting to the controller a rate of change of color codes as seen by the subscriber unit or the subscriber unit could report to the controller a new color code configuration when a prior color code configuration does not match the new color code configuration. In any event, each of these methods and other iterations will be described in further detail as each figure is fully described below.

Once again with reference to FIG. 2 and system diagram 10, both a subscriber unit 12 and controller or a controller within a terminal 22 keep a synchronized database (21 and 24) of locations, preferably additionally maintaining statistics as to the likelihood of the subscriber unit location. The terminal 22 will direct messages to the most likely location (s). If the terminal database indicates that the subscriber unit is likely in transition from one place to another, it can attempt to wait until the subscriber unit is likely to be in the new location if grade of service permits waiting. The subscriber unit will register its location with the controller if its database is incorrect in comparison to the actual location readings based current readings of color code, transmitter Ids, GPS information or other location generating information as is generally known in the art and contemplated within the present invention. These corrections cause both databases to remain synchronized. The table of locations and times are preferably identical. At step 14, as the subscriber unit moves through different coverage areas, it preferably checks a location table (within the subscriber unit) to see if it corresponds to where the terminal thinks it should be. At decision block 16, if the subscriber unit detects that it is where the terminal thinks it should be in accordance with the location table, then the subscriber unit does nothing at step 20. No re-registration is issued. The terminal will move its registration pointer to agree with the table without requiring an actual registration transmission from the subscriber unit. If the subscriber detects that it is not in the location the terminal 22 expects it to be, then depending on the likelihood of its receiving a message it sets a time at which to notify the terminal of its new location. In other words, at step 18, the subscriber unit will schedule an unsolicited update as to the subscriber unit's new location and additionally update the location tables at both the subscriber unit as well as the terminal. Heavy users would send a notice of the deviation from a profile (the table) almost immediately. Light users might wait several minutes to see if it moved into the correct location before sending a re-registration. Regardless, these registrations must obey the registration flow control bits on the outbound control channel.

Grade of service for delivery would go into the scheduling algorithm computation. At the terminal 22, the process begins when someone sends or leaves a message at block 11 for a particular subscriber unit. At the terminal 22, the table and corresponding statistics are preferably updated at block 24 as previously described. If a subscriber unit arrived at its expected location early or left its old location late by some period of time, that time would be compared against an action limit value, determined by the distribution of times, e.g. sigma. If the difference in time exceeded the limit, then the subscriber unit would initiate registration. The limit value would not only be determined in part by the delivery standard for the grade of service for that customer, making lower grades wait longer, but also by the actual measured variance in distributions, making smaller limits for highly disciplined users. What the terminal and subscriber unit together would be doing is trying to lower the expected number of registrations while maintaining high expected delivery success, within grade of service goals.

When a message is ready to be sent to the subscriber unit, any updated information from the subscriber unit is compared with the location table at step 26. At decision block 28, if the probability of success is high that the subscriber unit is the location designated by the table at the terminal, then the message is sent to the location designated at step 32. If the probability of success is low, then the controller in the terminal can schedule a WRU to determine the subscriber unit location at step 30. If the probability is cumulatively high that the subscriber unit will be in one of several locations, then the message could be transmitted via transmitters corresponding to those several locations at step 34.

Referring to FIG. 3, WRUs are eliminated when the system controller uses a method 40 that keeps a statistical profile for each subscriber unit in the system. The profile may include the color code and the probability associated with the subscriber unit based on the message delivery history. Of course, other data such as transmitter IDs or GPS information could be alternatively maintained to provide location information. At step 42 probability threshold "PThresh" is defined. The next message for a particular subscriber unit is queued for transmission at step 44. At step 46, it is determined if a profile exists for the particular subscriber unit. If no profile exists, a WRU is sent at step 48 to determine the subscriber unit location. If a profile does exist, then it is determined if adequate statistics exists for the subscriber unit at decision block 50. If there is insufficient statistics, a WRU at step 52 could be sent. If adequate statistics exist, then preferably the most probable cell location (T) comprising a single transmitter or set of transmitters is determined at step 54. At decision block 56, if the historical probability of a subscriber unit being associated with a particular cell, transmitter (or color code) is greater than PThresh, then the system delivers the message to the subscriber unit via the targeted transmitter (cell or transmitters) without first broadcasting a WRU command at step 59. Otherwise, if the probability is below the set threshold, then a WRU is sent at step 58. An example for PThresh could be 90%. Once again, it should be appreciated that our use of the words "color code" also apply to other methods of targeted messaging such as transmitter ID's, orthogonal codes, etc.

Referring to FIG. 4, the system controller keeps track of the rate of color code changes for each subscriber unit on a predetermined time frame basis (for example daily), or on a real-time basis. This will allow the system to decide between standard WRU/No WRU modes for those subscriber units whose rate of change is above or below a predetermined threshold value RccThresh. Thus, at step 62, a threshold RccThresh is set for the rate of change per a given time frame, for example 5 per day. At step 64, the next message for a given subscriber unit is queued. At decision block 66, it is determined if a rate of color code change for the given subscriber unit exists. If none exists, then a WRU is sent to the subscriber unit at step 68. If a rate of color code change exists, then at decision block 70, the rate of change as measured at the terminal is compared with the threshold RccThresh. If the rate of change measured is greater than the threshold, then a WRU is sent at step 72. If the rate of change is less than the threshold, then the last known color code T for the given subscriber unit is retrieved at step 74 and then subsequently transmitted to a transmitter or cell T at step 76.

Referring to FIGS. 5 and 6, in this embodiment the subscriber unit preferably automatically report to the system that its last color code response to a system initiated WRU is no longer valid (Color Code Invalid ). The subscriber unit continuously monitors the color code and reports to the system only when the color code has changed. The system sends a WRU to the subscriber unit only for the first message of the day, and for the first message scheduled after a Color Code Invalid (CCI) inbound transmission from the subscriber unit.

FIG. 5 illustrates the flow of operations (80) at a subscriber unit. Thus, at step 82, the subscriber unit waits for its next control frame and decodes the color code it is receiving. At block 83 it is determined if the color code is invalid for any reason, then a CCI is transmitted to the system at step 85 and the new color code is stored at step 84. If the color code is valid, the color code is compared to the last known decoded color code at step 86. If the color code changed at step 88, then a CCI is transmitted to the system 89 and the new color code is stored at step 84. Otherwise, the subscriber unit waits for the next control frame at step 82 again.

FIG. 6 illustrates the flow of operations (90) at a controller in accordance with this embodiment. The controller gets the next message for a particular subscriber unit at step 92. At block 94, if the message is the first of the day, then a WRU is sent to the subscriber unit at step 95 and otherwise the last known color code is retrieved at step 96. If the color code is reported invalid at step 97, then a WRU is sent at step 98. If the color code is valid, then the message is sent at step 99 through the last known color code previously retrieved at step 96.

Figure 7:
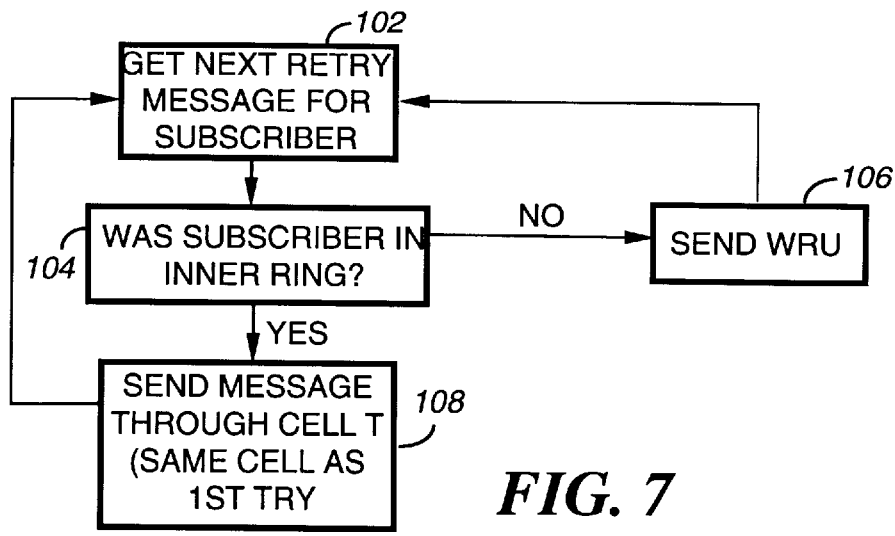
FIG. 7 is flow chart illustrating a method at a controller of reducing WRU transmissions using multi-ring profiling in accordance with another embodiment of the present invention.

Referring to FIG. 7, the subscriber unit reports its Color Code distance to the system utilizing multi-ring color code methods. If the unit is close to the base station (an inner ring) the system may determine not to send another WRU on retry messages. The system controller assumes that the unit is still in the same cell since its distance from the cell was short. In particular, with reference to method 100, a controller would get the next retry message for a particular subscriber unit at step 102 and determine whether the subscriber unit was within the inner ring at block 104. If the subscriber unit was determined to be in the inner ring, then the message is sent to the same cell as the first try at step 108, otherwise the controller transmits a WRU at step 106 to determine the subscriber unit location.

Figure 8:
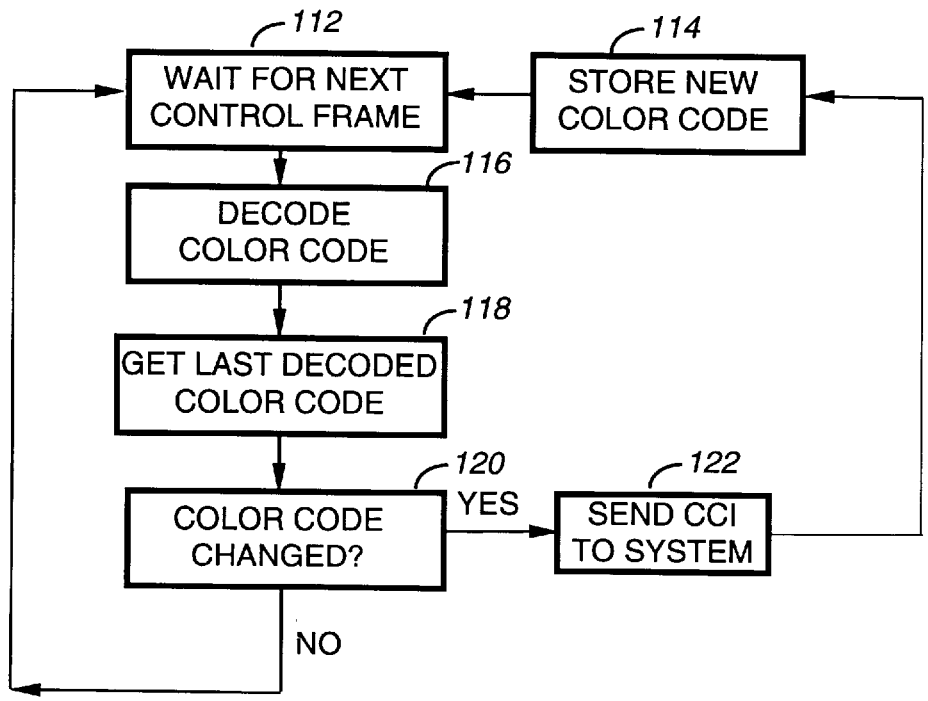
FIG. 8 is flow chart illustrating a method at a controller of reducing WRU transmissions by attaching new color codes to an acknowledgment in accordance with another embodiment of the present invention.

Referring to FIG. 8, method 110 describes the subscriber unit operation of automatically reporting its latest WRU location along with message acknowledgments when the subscriber unit location has changed. This eliminates the need for the system to send a WRU command to each subscriber unit with every message. Since subscriber units are more likely to be stationary rather than mobile with respect to a particular transmitter, the rate of location change transmission should be minimal during certain periods of the day. More particularly, the subscriber unit at step 112 would wait for the next control frame and decode the color code received at step 116. At step 118, the last known color code is retrieved and then compared at step 120. If the color code did not change, then the subscriber unit waits for the next control frame as described with step 112. If the color code changed, the subscriber unit sends a CCI at step 122 to the system and stores the new color code in memory at step 114.

Figure 9:
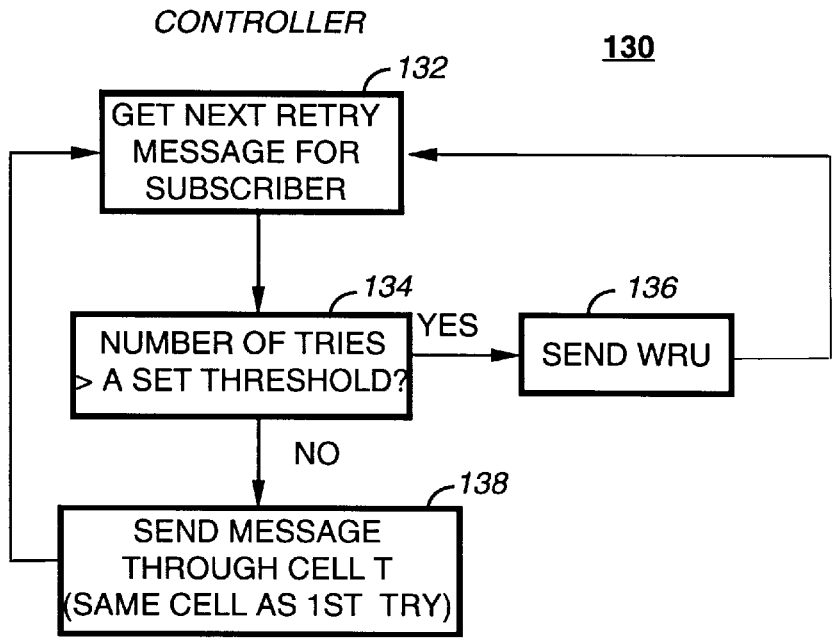
FIG. 9 is flow chart illustrating a method at a controller of reducing WRU transmissions by sending WRUs only after timing out in accordance with another embodiment of the present invention.

Referring to FIG. 9, the present invention in this alternative embodiment preferably utilizes the system controller in method 130 to automatically revert to a standard WRU operation mode after a predetermined number of unsuccessful attempts of delivering a message to a subscriber unit. At step 132, the controller gets the next message retry for a particular subscriber unit. If the number of tries at step 134 exceeds a predetermined threshold, then a WRU is sent at step 136. If the number of tries is below the threshold, the message is sent at step 138 through same the transmitter or transmitters that were used in a first try.

In another alternative embodiment, the present invention preferably uses information known about the subscriber unit to locate the unit. The system controller may send the messages to the previously known cells where the unit may be located based on the history of the subscriber unit. The previously known locations are stored in a list sorted by likelihood of the subscriber unit being located in the cell in question.

Utilizing this embodiment of the invention the system may also choose to automatically send retries of the message to the same unit without a WRU command as the controller assumes that a message retry would be sent on the same previously targeted site anyway. Referring to FIG. 10, a method 140 at a controller would preferably begin by getting the next message queued for a given subscriber unit at step 142. The controller at step 144 would then retrieve a sorted list of previously known locations for the given subscriber unit. If such a sorted list does not exist, then the system sends out a WRU at step 146. If the sorted list exists, then at step 148, the location of the first try is determined. At step 154, the next most probable cell location T corresponding to the first try location for the given subscriber unit is determined. Then, at step 156, the message is sent to this location T. If the list is exhausted at step 150, then a WRU is sent at step 152.

Figure 11:
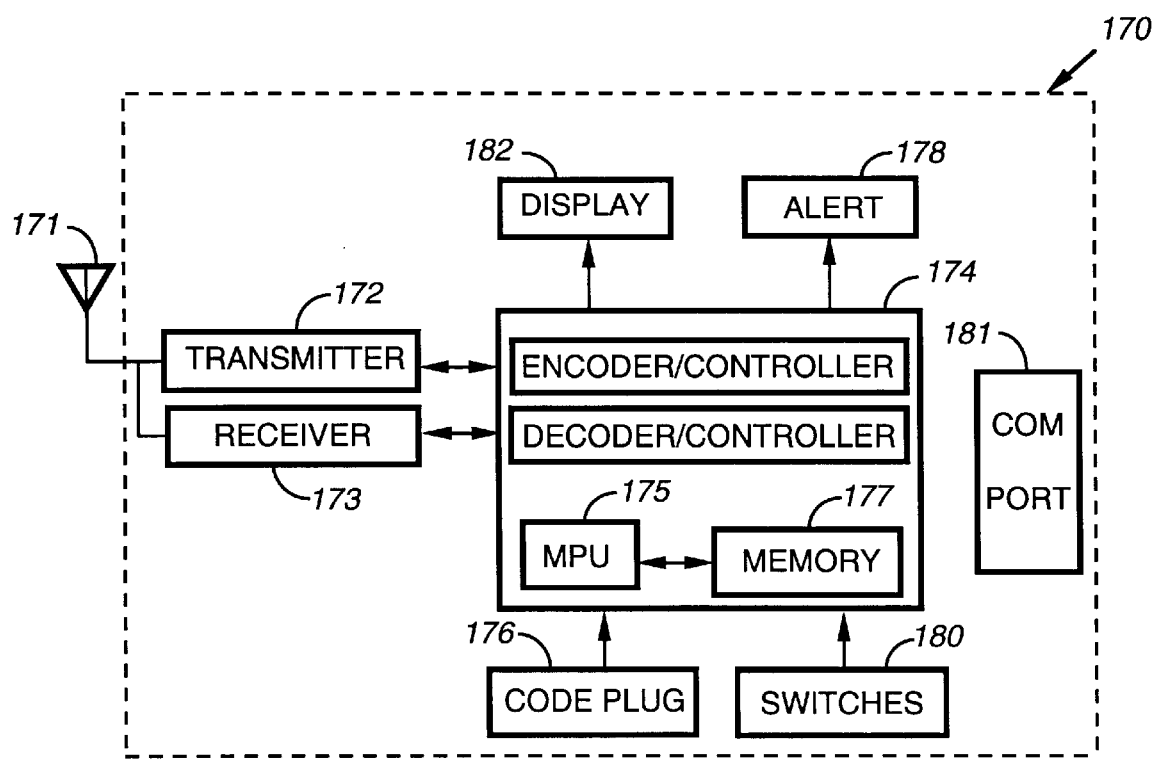
FIG. 11 is a block diagram of a subscriber unit in accordance with the present invention.

Referring to FIG. 11, a subscriber unit 170 for receiving non-real time targeted messages in a two way messaging system having a plurality of base transmitters preferably comprises a selective call receiver 173 coupled to a decoder and a controller (174) and a selective call transmitter 172 coupled to the controller and an encoder (174). The transceiver 170 preferably further comprises a memory 177 and a code plug 176 coupled to the controller 174. The subscriber unit preferably comprises a memory 177 coupled to the controller containing a profile of when the subscriber unit should be within the receiving range of select portion of the plurality of base receivers, wherein the subscriber unit does nothing if the controller determines that the subscriber unit is within the profile and transmits update information to the two-way messaging system if the subscriber unit is outside the profile. Preferably, the profile is toleranced to allow the subscriber unit to deviate from the profile to a predetermined tolerance without needing to update the two-way messaging system.

The selective call transceiver can further comprise a display 182 such a liquid crystal display or a tactile or audible alert 178 such as a transducer or vibrator motor. The device 170 includes an antenna 171 for intercepting transmitted RF signals and for transmitting RF signals via the transmitter 172. The antenna 171 couples a received signal to a receiver 173, the receiver 173 and the transmitter 172 forming a transceiver. The transceiver produces a data stream representative of a demodulated received signal coupled to a decoder/controller 174. The transceiver (172, 173) is also responsive to a modulation input such as data received from the decoder/controller 174 to frequency modulate a carrier signal for transmission out from the device 170. As is well known in the art, the decoder/controller 174 may include a central processing unit such as a microprocessor 175 or the like for processing demodulated signal information in accordance with the software stored in a memory 177 of the decoder/controller 174. The decoder/controller 174 is preferably responsive to inputs from one or more switches 180 or other input devices to generate data that is coupled to the transceiver (172, 173) for transmission out from the device 170. The RF signals transmitted by the transmitter units of a paging system typically include control information containing an address that identifies a particular device 170. In a typical paging system, page message information follows the control information. The decoder/controller 174 decodes a received address by comparing it with one or more addresses stored in a code plug or code memory 176. If the decoder/controller 174 detects a match between a received address and a stored address, an alert signal may be generated by a device 178 so as to alert a user that a message has been received by the device 170. The alert signal may be an audible and/or tactile alert such as a silent vibrating alert. It is noted that if the RF signals only contain control information and no user viewable message, an alert need not be generated upon an address match. The switches 180 may be actuated by a user to select between the types of alerts as well as for inputting information to the memory 177 and causing a message stored in the memory of the decoder/controller 174 to be accessed for display on a display 182. The switches 180 may also provide additional functions such as reset, read, delete, etc. as is known or generate two-way functions or responds to messages. The device 170 may also include a conventional communication port 81 for hardwire connection to a wired subsystem as well.

It should be understood that the disclosed embodiments are merely examples and the invention is not restricted thereto. It should be further understood by those skilled in the art that variations and modifications can be made without deviating from the scope and spirit of the present invention defined by the appended claims.

What is claimed is:

1. A method of targeting messages to a subscriber unit in a non-real time messaging system, comprising the steps at a controller of:

establishing a profile, the profile assuming that the subscriber unit is within a receiving range of a predetermined base transmission area for transmission of messages to the subscriber unit the step of establishing a profile further comprises the step of maintaining a synchronized database of locations where the subcriber unit is likely to be, wherein the locations are synchronized between a memory at the controller and a memory at the subscriber unit;

detecting whether the subscriber unit is not within the receiving range of the predetermined base transmission area and directing transmissiorns of messages to an identified area if the subscriber unit specifies the identified area; and otherwise directing transmissions to the predetermined base transmission area.

2. The method of claim 1, wherein the step of detecting that the subscriber unit is not within the receiving range of predetermined base transmission area comprises the step of having the subscriber unit register its approximate location with the controller when the synchronized data base of locations do not match for a given period of time.

3. The method of claim 1, wherein the step of detecting that the subscriber unit is not within the receiving range of a predetermined base transmission area further comprises the step of receiving color codes transmitted by base transmitters to the subscriber units and reporting by the subscriber unit to the controller of the color codes that are not within the predetermined base transmission area.

4. The method of claim 1, wherein the step of assuming the subscriber unit is within a receiving range of a predetermined base transmission area further comprises the step of statistical location profiling at the controller for identifying the predetermined base transmission area.

5. The method of claim 1, wherein the step of establishing a profile that assumes the subscriber unit is within a receiving range of a predetermined base transmission area further comprises the step at the controller of receiving a report from the subscriber unit of a rate of change of color codes as seen by the subscriber unit.

6. The method of claim 1, wherein the step of establishing a profile that assumes the subscriber unit is within a receiving range of a predetermined base transmission area further comprises the step at the controller of receiving a report from the subscriber unit of a new color code configuration when a prior color code configuration does not match the new color code configuration at the subscriber unit.

7. The method of claim 1, wherein the step of establishing a profile that assumes that the subscriber unit is within a receiving range of a predetermined base transmission area further comprises the step of assuming that the subscriber unit is within one of a plurality of prioritized locations and transmitting a message on a corresponding prioritized basis to each of the plurality of prioritized locations where the subscriber unit is assumed to be until an acknowledgment is received from the subscriber unit.

8. The method of claim 1, wherein the step of establishing a profile further comprises the step of retrying transmissions of a message for a given number of times to a first predetermined base transmission area and then retrying messages to other predetermined base transmission areas for a given number of times on a prioritized basis until an acknowledgment is received from the subscriber unit.

9. A method of targeting messages to a subscriber unit in a nonreal time messaging system having a controller, comprising the steps at a subscriber unit of:

maintaining a synchronized database of locations where the subscriber unit is likely to be, wherein the locations are synchronized between a memory at the controller and a memory at the subscriber unit;

monitoring base transmitter transmissions for correlation with a predetermined base transmission area stored at the memory location at the subscriber unit; and transmitting a subscriber unit's location information to the controller if the subscriber unit detects that the base transmitter transmissions do not correlate with the predetermined base transmission area stored in memory as well as directing the controller to send subsequent transmissions to base transmitters corresponding to the subscriber unit's location information, otherwise receiving messages without a preceding transmission of the subscriber unit's location information to the controller.

10. The method of claim 9, wherein the method further comprises the step of having the subscriber unit register its approximate location with the controller when the synchronized data base of locations do not match for a given period of time.

11. The method of claim 9, wherein the method further comprises the step of receiving color codes transmitted by base transmitters and reporting by the subscriber unit to the controller of the color codes so that are not within the predetermined base transmission area.

12. The method of claim 9, wherein the method further comprises the step at the subscriber unit of reporting to the controller a rate of change of color codes as seen by the subscriber unit.

13. The method of claim 9, wherein the method further comprises the step at the subscriber unit of reporting to the controller a new color code configuration when a prior color code configuration does not match the new color code configuration.

14. A non-real time messaging system for targeting messages to a subscriber unit, comprises a controller that assumes the subscriber unit is within a receiving range of a predetermined base transmission area for trinsmnission of messages to the subscriber unit and detects when the subscriber unit is not within the receiving range of a predetermined base transmission area, wherein the controller directs transmissions of messages to an identified area if the subscriber unit identifies the identified area and otherwise transmits to the predetermined base transmission area;

a memory location at the subscriber unit and a memory location at the controller both containing a synchronized database of locations where the subscriber unit is likely to be; and a plurality of base receivers coupled to the controller for receiving transmissions from the subscriber units and allowing the controller to detect when the subscriber unit is not within the receiving range of a predetermined base transmission area.

15. A subscriber unit for receiving non-real time targeted messages in a two way messaging system having a plurality of base transmitters, comprises:

a selective call receiver coupled to a decoder and a controller;

a selective call transmitter coupled to the controller and an encoder; and a memory coupled to the controller containing a profile of a select portion of the plurality of base receivers that the subscriber unit should be within the receiving range of, wherein the subscriber unit does nothing if the controller determines that the subscriber unit is within the profile and transmits update information to the two-way messaging system if the subscriber unit is outside the profile, said profile synchronized with a further database included in said two-way messaging system.

16. The subscriber unit of claim 15, wherein profile is toleranced to allow the subscriber unit to deviate from the profile to a predetermined tolerance without needing to update the two-way messaging system.

* * * * *